United States Patent
Brosh et al.

(10) Patent No.: US 7,661,318 B2
(45) Date of Patent: *Feb. 16, 2010

(54) STRESS ISOLATED PRESSURE SENSING DIE, SENSOR ASSEMBLY INLUDING SAID DIE AND METHODS FOR MANUFACTURING SAID DIE AND SAID ASSEMBLY

(75) Inventors: Amnon Brosh, Santa Monica, CA (US); Sebastiano Brida, Bourges (FR)

(73) Assignee: Auxitrol S.A., Bourges (FR)

( * ) Notice: Subject to any disclaimer, the term of this patent is extended or adjusted under 35 U.S.C. 154(b) by 154 days.

This patent is subject to a terminal disclaimer.

(21) Appl. No.: 11/903,871

(22) Filed: Sep. 25, 2007

(65) Prior Publication Data

US 2008/0016683 A1     Jan. 24, 2008

Related U.S. Application Data

(63) Continuation-in-part of application No. 11/712,314, filed on Feb. 27, 2007, now Pat. No. 7,475,597.

(60) Provisional application No. 60/776,833, filed on Feb. 27, 2006.

(51) Int. Cl.
    *G01L 7/08* (2006.01)
(52) U.S. Cl. .................................................. 73/715
(58) Field of Classification Search .................. 73/715, 73/721, 727, 720
    See application file for complete search history.

(56) References Cited

U.S. PATENT DOCUMENTS

| | | | |
|---|---|---|---|
| 4,237,775 A | 12/1980 | Eisele |
| 4,800,758 A | 1/1989 | Knecht et al. |
| 4,930,929 A | 6/1990 | Maglic |
| 5,926,692 A | 7/1999 | Kurtz |
| 5,945,605 A | 8/1999 | Julian et al. |
| 6,093,579 A | 7/2000 | Sathe |
| 6,528,340 B2 | 3/2003 | Haji-Sheikh et al. |
| 6,822,318 B2 | 11/2004 | Honer et al. |

FOREIGN PATENT DOCUMENTS

| | | |
|---|---|---|
| DE | 19714703 A1 | 10/1997 |
| DE | 10349540 A1 | 5/2005 |
| WO | WO-01/69194 A | 9/2001 |

*Primary Examiner*—Andre J Allen
(74) *Attorney, Agent, or Firm*—Blakely, Sokoloff, Taylor & Zafman

(57) ABSTRACT

The invention concerns a pressure sensing die to be mounted on a base, comprising:
  a diaphragm structure with a deflectable pressure sensing diaphragm whose deflection is representative of the pressure and sensing elements for detecting the deflection of the sensing diaphragm;
  a pedestal supporting the diaphragm structure;

wherein the pedestal is a composite pedestal comprising top and bottom platforms connected by at least one small link having a mean cross-section smaller than the cross-section of the top platform, said small link isolating at least some of the stresses, produced by the mounting of the pressure sensing die on the base, from said deflectable pressure sensing diaphragm.

29 Claims, 6 Drawing Sheets

STRESS ISOLATED PRESSURE SENSING DIE, SENSOR ASSEMBLY INLUDING SAID DIE AND METHODS FOR MANUFACTURING SAID DIE AND SAID ASSEMBLY

FIELD OF THE INVENTION

The present invention relates to sensor assemblies. More particularly, it relates to sensor assemblies of the type comprising:
- a sensing die including a deflectable sensing diaphragm whose deflection is representative of the pressure and sensing elements for detecting the deflection of the diaphragm;
- a base for mounting the sensing die.

The invention also relates to such a stress isolated pressure sensing die, as well as to methods for manufacturing said die and said assembly.

BACKGROUND OF THE INVENTION

One already knows dual stack sensor MEMS assemblies, wherein the sensing die comprises a Pyrex® pedestal supporting a sensing diaphragm, mounted on a metal, ceramic or plastic base.

Such a dual stack pressure sensing die is illustrated on FIG. 1 with a pressure sensing structure 1 and a pedestal 2.

Pressure sensing structure 1 generally consists of a bulk micro machined diaphragm 5 supported by rigid outer frames 7, said diaphragm 5 and said frames 7 being formed on a silicon wafer by chemical etching. Strain gages, or piezoresistors, 6 are diffused, implanted or deposited on diaphragm 5 for sensing the deflection produced in diaphragm 5 by applied pressure. Pedestal 2 may be made of a Pyrex wafer which functions as a pedestal for supporting pressure sensing structure 1. For absolute (PSIA) pressures, pedestal 2 has no vent hole whereas a vent hole 14 is provided on pedestal 2 for gage (PSIG) and differential (PSID) pressures.

The two wafers 1, 2 are anodic bonded and are sawed to form a dual stack pressure sensing die of a type which is commonly used in the piezoresistive pressure sensor industry. Pyrex pedestal 2 of the dual stack pressure sensing die is attached with an elastic adhesive 8, such as RTV, to a metal or ceramic base 3, said adhesive and said base both having a thermal coefficient of expansion larger than that of Pyrex glass. The RTV must be cured at a high temperature.

Considerable "die-attach" compression stresses are locked-in the RTV adhesive during the curing process.

The stress deforms the Pyrex pedestal 2 and the outer frame 7 of the silicon pressure sensing structure 1, which in turn deflects the pressure sensing diaphragm 5. The piezoresistors sense the diaphragm 5 deflection and produce a residual null offset output that is proportional to the locked in die-attach stresses.

Pressure sensors are customarily required to operate in a wide range of temperatures.

However, the temperature variations increase and decrease the locked in die-attach stress in the RTV adhesive.

And, since RTV is not perfectly elastic, the compression stress locked in the RTV does not return perfectly to its original value after each temperature cycle involving temperature hysteresis.

This temperature hysteresis is the main source of short term instability and drift of sensor offset. In addition, the effects of continuing bond relaxation and RTV aging are the source for long term deterioration of die-attach stresses and produce long term sensor drift.

As a result, pressure sensors employing conventional pedestals suffer from short and long term drift problems, which are exacerbated in low pressure range sensors that employ thin diaphragms.

Earlier attempts to isolate the die-attach drift problem involved etching slots or channels in the silicon die around the sensing diaphragm (see US 2001/0001550 A1) or adding a plurality of relief channels etched in an upper and a lower surface of an intermediate layer (see U.S. Pat. No. 6,822,318 B2).

The use of slots or channels as stress isolators requires them to be relatively flexible.

Since their geometry is dictated by the limited thickness of silicon wafer used in MEMS sensors, this approach requires multiple upper and a lower surface channels is slots with very thin webs, which is problematical and costly to implement.

Furthermore, etching slots or channels in the silicon die around the sensing diaphragm in close proximity to the piezoresistors may create stability problems.

SUMMARY OF THE INVENTION

One aim of the present invention is to overcome the various drawbacks of the dual stack sensors of the prior art.

According to one aspect of the invention, it is proposed a novel composite pedestal comprising two platforms connected by one or more small link. The two linked platform pedestal geometry act as die-attach stress isolation.

More particularly, it is proposed a pressure sensing die to be mounted on a base, comprising:
- a diaphragm structure with a deflectable pressure sensing diaphragm whose deflection is representative of the pressure and sensing elements for detecting the deflection of the sensing diaphragm,
- a pedestal supporting the diaphragm structure,
wherein the pedestal is a composite pedestal comprising top and bottom platforms connected by at least one small link having a mean cross-section smaller than the cross-section of the top platform, said small link isolating at least some of the stresses, produced by the mounting of the pressure sensing die on the base, from said deflectable pressure sensing diaphragm.

Said stress may be mechanically induced or result of thermal mismatch between the pressure sensing die and the base. Thermal mismatch indeed may appear at given temperatures if the pressure sensing die has a global thermal coefficient different from those of the base. For example, such a thermal stress may appear if the composite pedestal comprises glass, silicon, borosilicate or Pyrex, and if the base comprises a metal header or a ceramic or plastic substrate.

Such induced die-attach compression stress deforms the bottom platform of the composite pedestal. However, since the small link isolates the top platform from the bottom platform, only a small fraction of the die-attach stress reaches the outer frame of the silicon pressure sensing structure. This minimizes the deflection of the pressure sensing diaphragm and reduces the residual null offset output. This diminishes the prior art problems and in particular those related to the elastic behavior of RTV, such as temperature hysteresis, aging and bond relaxation. Short and long term stability is improved.

According to another aspect of the invention the bottom platform is a bulk structure comprising a protrusion in its middle acting as a small link.

The composite pedestal concept can be further enhanced by specifically shaping the bottom platform to incorporate at least one small link acting as extra stress isolation elements.

According to another aspect of the invention, the bottom platform comprises a flexible membrane supported by a rigid outer frame. The small link is positioned in the middle of the flexible membrane. The flexible membrane is thinned down so as to be is thinner than the rigid outer frame and to form a thinned down web. The flexible membrane extends inwardly from the rigid outer frame. The rigid outer frame and the small link are surrounded by the thinned down web forming the flexible membrane. The small link is connected to the top platform to constitute a flexible composite pedestal.

The thinned down web absorbs some of the die-attach stress allowing only a fraction of the remaining stress to reach the middle link. Therefore, stress reduction by the flexible web and the small link combine to prevent most of the die attach stress from reaching the pressure sensing diaphragm. Sensor stability is improved significantly.

According to yet another aspect of the invention, the bottom platform comprises a second small link placed on its outer edge, and in particular on the outer edge of the rigid outer frame. First and second small links are connected to the top platform. The second—the outer—link acts as a small stress isolating link between the top and the bottom platforms. The thin web surrounding the middle vented link provides a flexible seal for the bottom platform that prevents the pressure from leaking through the vent hole in the base.

According to another aspect of the invention, the bottom platform comprises a flexible membrane, a rigid outer frame and a cantilever beam. The flexible membrane is further thinned down so as to form a thinned down web. The membrane is thinner than the rigid outer frame. The flexible membrane extends inwardly from the rigid outer frame. The cantilever beam is surrounded by the thinned down web and is further clamped to the rigid outer frame on one end and comprises a small link formed on its free end. The small link is connected to the top platform. The rigid outer frame of the bottom platform is attached with adhesive to a metal or ceramic base.

The die-attach compression stress deforms the outer frame of the platform. Since the cantilever beam is clamped only on one side, it is incapable of bending and allows just a fraction of the remaining stress to reach the top platform through the link. The combination of the cantilever beam and the small link prevents most of the die attach stress from reaching the pressure sensing diaphragm. Sensor stability is improved significantly.

Additionally, the small link comprises a vented hole so as to form a middle vented link located in the middle of the flexible membrane when presents.

As an alternative and according to another aspect, a sealed pressure sensing die is provided. The thinned down web is omitted leaving the cantilever beam and the small link surrounded by open space. The rigid outer frame of the bottom platform is attached with adhesive to a metal or ceramic base.

A sensor is also provided which comprises a proposed triple stack die and a base.

Each composite pedestal can be manufactured individually and attached to the diaphragm structure one at time employing die level processing. However, this process is far too expensive.

The invention also teaches a cost effective wafer level method for manufacturing several types of composite pedestals based on joining Pyrex and silicon wafers. In this method the top platform is a Pyrex wafer and the bottom platform is a silicon wafer processed to contain at least one small link.

According to another aspect, the invention proposes a method for manufacturing a pressure sensing die to be mounted onto a base.

In particular, the method comprises the following steps:
forming in a first wafer a pressure diaphragm structure with a deflectable pressure sensing diaphragm whose deflection is representative of the pressure and sensing elements for detecting the deflection of the sensing diaphragm;
providing a second wafer acting as a top platform of a composite pedestal;
forming in a third wafer at least one small link having a mean cross-section smaller than the cross-section of the top platform, said small link isolating at least some of the stresses, produced by the mounting of the pressure sensing die on the base, from said deflectable pressure sensing diaphragm;
attaching the second wafer to the third wafer through said at least one small link;
attaching the second wafer to the first wafer.

BRIEF DESCRIPTION OF THE DRAWINGS

Other features and advantages of the invention will appear in the following description. Embodiments of the invention will be described with reference to the drawings, in which:

FIG. 7A shows the distortion of a conventional dual stack die attached through its glass pedestal to a header or substrate.

FIG. 7B show the distortion for a triple stack die attached through its flexible linked composite pedestal, according to the second embodiment of the invention, to a header or substrate.

DETAILED DESCRIPTION OF VARIOUS EMBODIMENTS

First Embodiment

Figure 2:
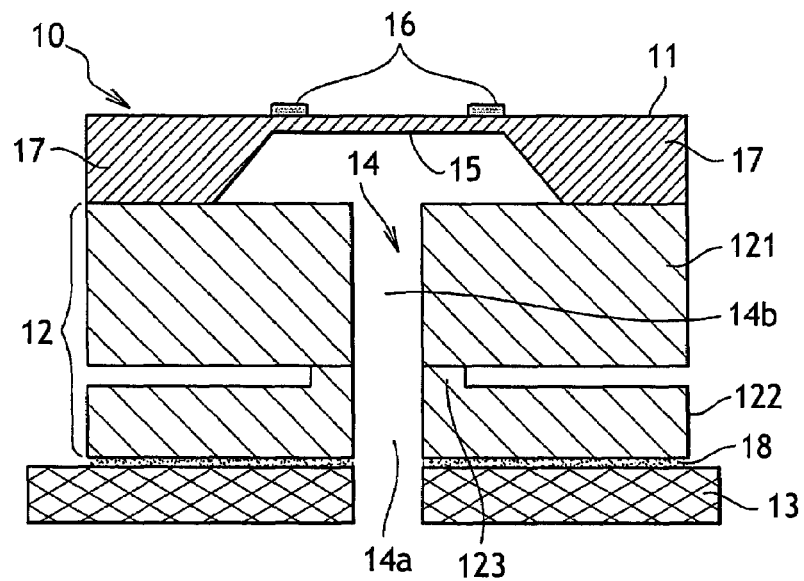
FIG. 2 is a cross-sectional view of a vented version of a triple stack piezoresistive pressure sensing die with a basic linked composite pedestal according to a first embodiment of the invention.

FIG. 2 is a cross-sectional view of a triple stack sensor die, with a composite pedestal 12 mounted on a base 13. Composite pedestal 12 comprises a top platform 121 and a bottom platform 122.

A diaphragm structure 11 is connected to top platform 121, for example through a bonding, such as an anodic bonding. Said diaphragm structure 11 comprises a sensing diaphragm 15 supported by rigid outer frames 17 which are bulk micro machined by chemical etching of the bottom surface of a silicon wafer. Strain gages, or piezoresistors 16 are diffused, implanted or deposited on the diaphragm 15 for sensing the stress produced in the diaphragm by applied pressure.

Top and bottom platforms 121 and 122 of the composite pedestal 12 are connected by a link 123 having a mean cross-section smaller than the cross-section of the top platform. Said small link 123 implements isolating deflectable pressure sensing diaphragm 11 mounted on the top platform of the composite pedestal from at least some of the stress produced by the mounting of the pressure sensing die on the base 13. It may be round, square, tapered-shaped. Other shapes may also be contemplated. Said small link 123 may for instance be a rod whose axis extending generally perpendicular to the sensing diaphragm 15.

Top platform 121 may be made from a Pyrex wafer. Bottom platform 122 may be made from silicon, glass, Pyrex, or borosilicate wafer, and can be attached to the top platform through small link 123 through a bonding, such as an anodic bonding glass frit or thermo-compression bonding.

Composite pedestal 12 may present a vent hole 14 or a plurality of vent holes, for allowing gas or a fluid going through.

Said basic composite pedestal 12, comprising top platform 121, bottom platform 122 and small link 123, is fabricated as follows.

Small protrusions corresponding to small link 13 are surface machined on the top surface of a silicon wafer. For vented pressure applications, the bottom surface of the silicon wafer is etched all the way through the protrusions 13 to create a vent hole (or vent holes) 14a that are aligned with a vent hole (or vent holes) 14b on top platform 121.

The protrusion side of the silicon wafer is anodic bonded to the bottom of top platform Pyrex wafer. The pressure sensing wafer 11 is bonded on the top of top platform 121 to form a triple silicon-Pyrex-silicon wafer assembly.

The silicon-Pyrex-silicon triple wafers are sawed into triple stack dies 10.

The protrusions act as the small links 13 of the basic linked composite pedestal 12.

Die 10 is mounted by attaching bottom platform 123 to a metal or ceramic base 13 using adhesive 18. The small link 73 blocks some of the die-attach compression from deforming the top platform 121, which reduces the deformation of the pressure sensing diaphragm 15.

As a result, the residual offset output produced by diaphragm piezoresistors is lowered. The consequences of the imperfect elastic behavior of RTV, such as temperature hysteresis, aging and bond relaxation, are lessened. Short and long term stability is improved.

Second Embodiment

Figure 3:
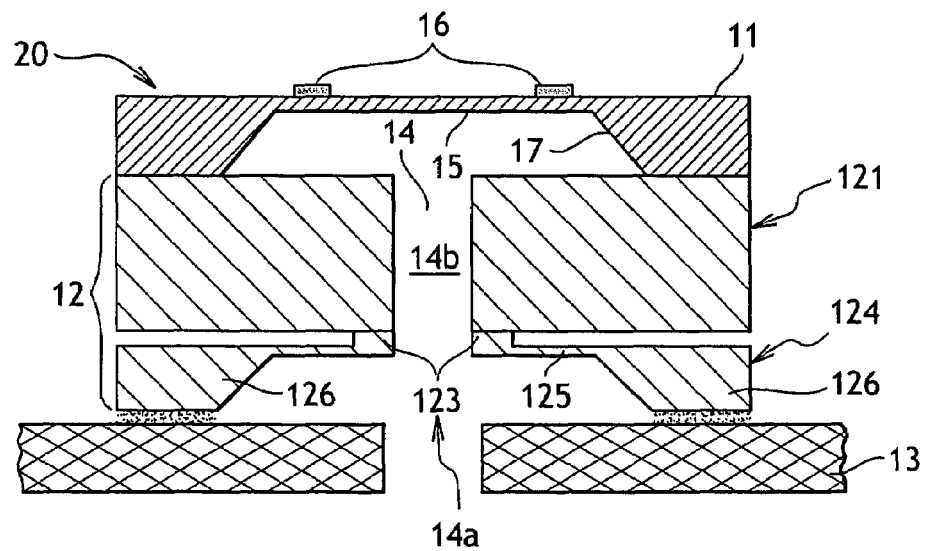
FIG. 3 is a cross-sectional view of a vented version of a triple stack piezoresistive pressure sensing die employing a flexible linked composite pedestal according to a second embodiment of the invention, the die being mounted on a header or substrate.

FIG. 3 illustrates a cross-sectional view of a vented version of a triple stack pressure sensing die with a flexible composite pedestal mounted on a header or substrate.

On the embodiment as represented on this drawing, bottom platform 122 of the die represented on FIG. 2 is replaced by bottom platform 124 which comprises a central bulk micro machined flexible membrane 125, supported by rigid outer frames 126, formed on a silicon wafer by chemical etching of the bottom surface of a silicon wafer. Flexible membrane 125 is thinned down so as to form a thinned-down web. In addition, small protrusions, surrounded by the thinned-down web 125, are surface machined on the top surface of the silicon wafer to realize small link 123.

The diaphragm structure 11 is bonded on the top of top platform Pyrex wafer 121 to form a triple silicon-Pyrex-silicon wafer assembly 20. The triple wafer assembly is sawed into triple stack dies 20 whereby the protrusions 123, surrounded by the thinned-down web 125, perform as a flexible composite pedestal. Then the die 20 is mounted by attaching bottom platform 124 through the rigid outer frames 126 to metal or ceramic base 13 using adhesive 18.

The die-attach compression stress deforms the rigid outer frame 126 of the bottom platform which bends flexible web 125.

The use of such a flexible membrane 125 permits to absorb some of the die-attach stress allowing only a fraction of the remaining stress to reach the middle link.

Stress reduction by the thinned down web prevents—together with the small link—most of the die attach stress from reaching the pressure sensing diaphragm. Sensor stability is improved significantly.

Third Embodiment

Figure 4A:
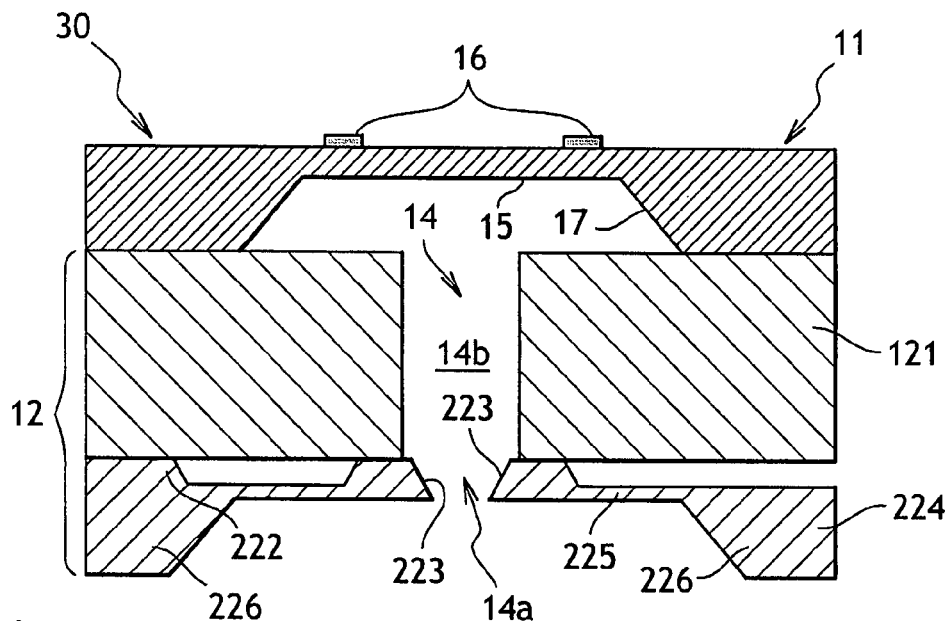
FIG. 4A is a cross-sectional view, according to A-A plane of FIG. 4B, of a vented version of a triple stack piezoresistive pressure sensing die with a dual link composite pedestal according to the second embodiment of the invention.
Figure 4B:
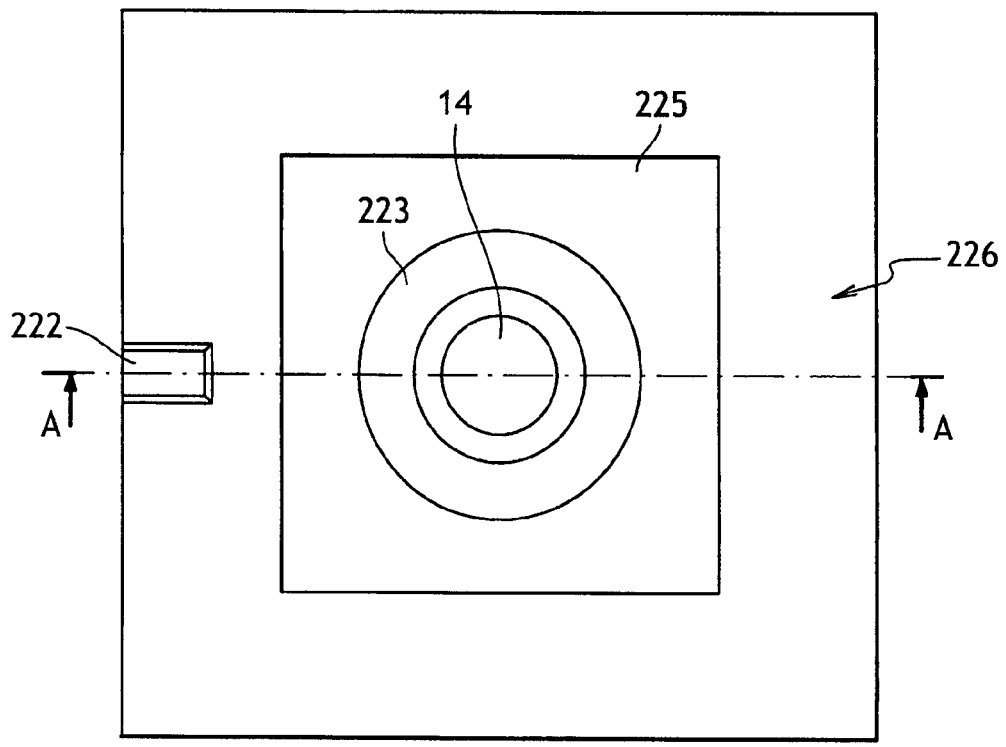
FIG. 4B is a top view of the pressure sensing die of FIG. 4A.

FIG. 4A illustrates a cross-sectional view of a vented version of a triple stack pressure sensing die employing a dual link composite pedestal and FIG. 4B shows the view of the vented version of a triple stack pressure sensing die employing a dual link composite die.

On this figure, the bottom platform corresponds to element 224 which comprises a flexible membrane 225, supported by a rigid outer frame 226 which is bulk micro machined by chemical etching of the bottom of a silicon wafer. In addition, two small protrusions 222 and 223 are surface machined on the top surface of the silicon wafer. Protrusion 222 is on the outer edge of rigid outer frame 226. It may be a rod or tapered shaped. Protrusion 223 is situated in the middle of flexible membrane 225. It may be square-shaped.

The diaphragm structure 11 is bonded on the top of top platform 121 to form a triple silicon-Pyrex-silicon wafer assembly 30.

The triple wafer assembly is sawed into triple stack dies 30 comprising a vented pressure sensing capsule whereby outer link 222 is acting as a small rigid link connected to pedestal 121.

The vented middle link 223 surrounded by thinned down web 225 seals the bottom platform 224 to prevent the pressure from leaking through the vent hole.

Flexible membrane 225 permits to absorb some of the die-attach stress allowing only a fraction of the remaining stress to reach middle link 223. Protrusion 222 located on the rigid outer frame also provides a rigid bond. The combination of these two protrusions inhibits the die-attach stresses developed in the rigid outer frame 67.

Fourth Embodiment

Figure 5A:
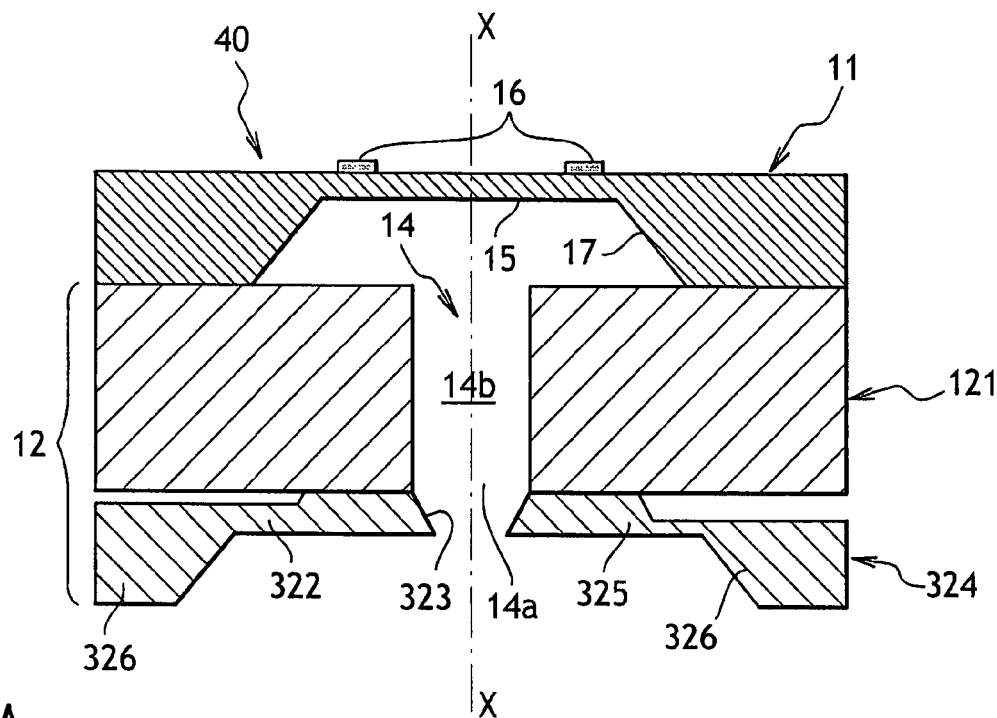
FIG. 5A is a cross-sectional view, according to A-A plane of FIG. 5B, of a vented version of a triple stack piezoresistive pressure sensing die with a cantilever beam linked composite pedestal according to a third embodiment of the invention.
Figure 5B:
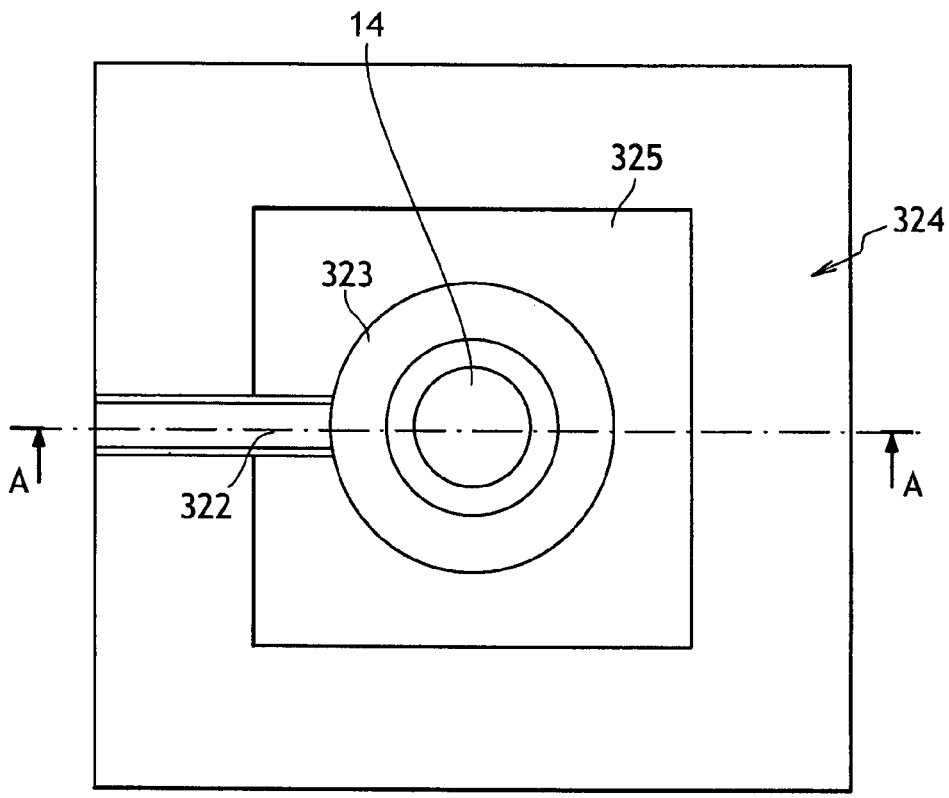
FIG. 5B is a top view of the pressure sensing die of FIG. 5A.

FIG. 5A illustrates a cross-sectional view of a vented version of a triple stack pressure sensing die employing a cantilever beam composite pedestal and FIG. 5B shows the view of the vented version of a triple stack pressure sensing die employing a cantilever beam composite pedestal.

On these figures, the bottom platform—referenced 324—comprises a flexible membrane 325 which is thinned down so as to form a thinned-down web. Said membrane 325 is supported by a rigid outer frame 326 which surrounds said membrane 325 and which is bulk micro machined by chemical etching of the bottom of a silicon wafer.

In addition, a cantilever beam 322 comprising a protrusion (small link 323) on its free end is surface machined on the top surface of the silicon wafer. Said protrusion 323 and the cantilever beam 322 are surrounded by the thinned down web consisting in membrane 325.

Cantilever beam 322 is a (rigid) stiff beam extending from the rigid outer frame 326 towards a central region of the bottom platform 34. It stays (rigid) solid under stress. The length of the beam 322 is preferably chosen so as to allow the small link 323 to solidly maintain top platform 121 and diaphragm structure 11.

The diaphragm structure 11 is bonded on the top platform 121 to form a triple silicon-Pyrex-silicon wafer assembly 40.

The triple stack pressure sensing die 40 consists of diaphragm structure 11 and a vented version of cantilever beam composite pedestal 324. The protrusion side of the silicon wafer is anodic bonded to the top platform Pyrex wafer 121.

The triple wafer assembly is sawed into triple stack dies 40 comprising a vented pressure sensing capsule with the cantilever beam and the protrusions acting as stress isolators and the thin web acting as a flexible seal between the top 121 and bottom 34 platforms.

The rigid outer frame 326 of composite pedestal 12 is attached with adhesive to a metal or ceramic base (not shown).

The die-attach compression stress deforms the rigid outer frame 326 of the bottom platform.

Since cantilever beam 322 is attached only to one side of outer frame 326, it is incapable of bending, which uncouples most of the die-attach stress while remaining stress is compelled to reach the top platform 121 through the link 323.

The combination of the stress isolation by cantilever beam 322 and small link 323 prevents most of the die attach stress from reaching the pressure sensing diaphragm 15.

Fifth Embodiment

Figure 5C:
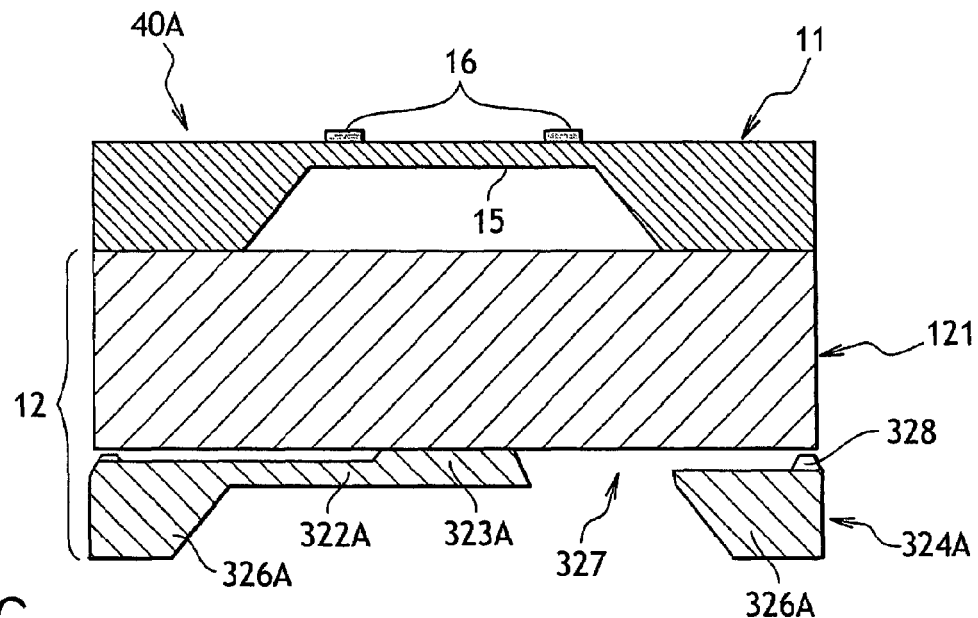
FIG. 5C is a cross-sectional view, according to A-A plane of FIG. 5D, of a sealed absolute version of a triple stack piezoresistive pressure sensing die with a cantilever beam linked composite pedestal according to the third embodiment of the invention.
Figure 5D:
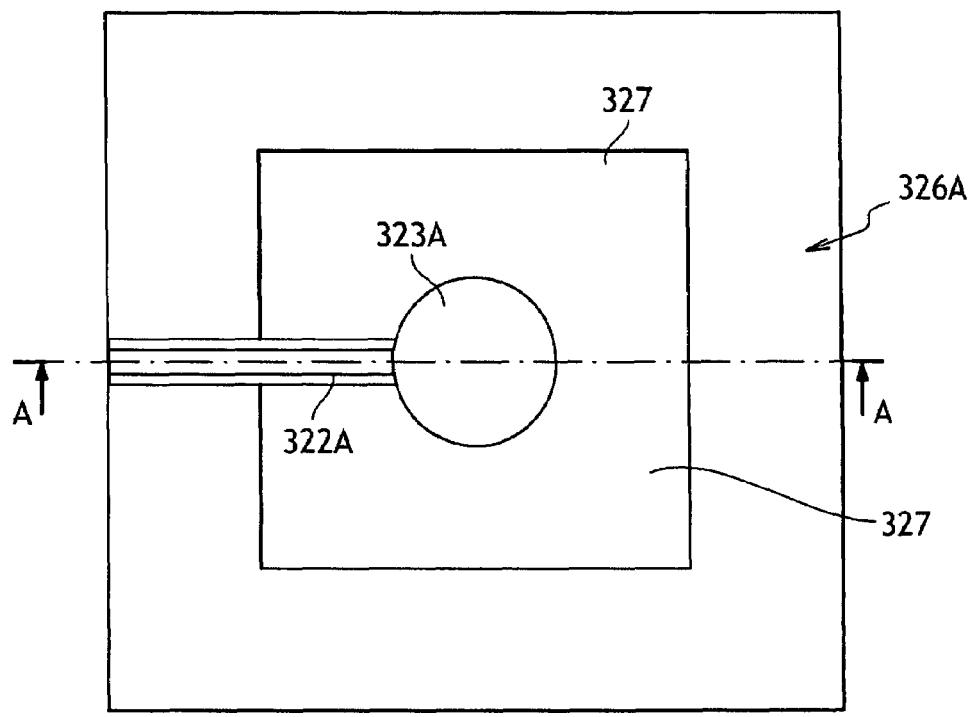
FIG. 5D is a top view of the pressure sensing die of FIG. 5C.

FIG. 5C illustrates a cross-sectional view of a un-vented version of a sealed version of a triple stack pressure sensing die employing a cantilever beam linked stress isolator and FIG. 5D shows the view of the sealed version of a triple stack pressure sensing die employing a cantilever beam linked stress isolator.

On this figure, the bottom platform 324A comprises a rigid outer frame 326A, which are bulk micro machined by chemical etching of a silicon wafer. In addition, a cantilever beam 322A comprising a small protrusion 323A on its free end is surface machined on the top surface of the silicon wafer.

A thrust 328 is provided on rigid outer frame 326A.

Said cantilever 322A and said small protrusion 323A are surrounded by an opened space 327.

The protrusion side of the silicon wafer is anodic bonded to top platform 121.

The diaphragm structure 11 is bonded on top platform 121 to form a triple silicon-Pyrex-silicon wafer assembly 40A.

The outer frame 326A of composite pedestal 324A is attached with adhesive to a metal or ceramic base (not shown).

The die-attach compression stress deforms the outer frame 326A of the mounting platform, which is incapable of bending the cantilever beam 322A attached on one side only to the outer frame 37A.

Sixth Embodiment

Figure 6:
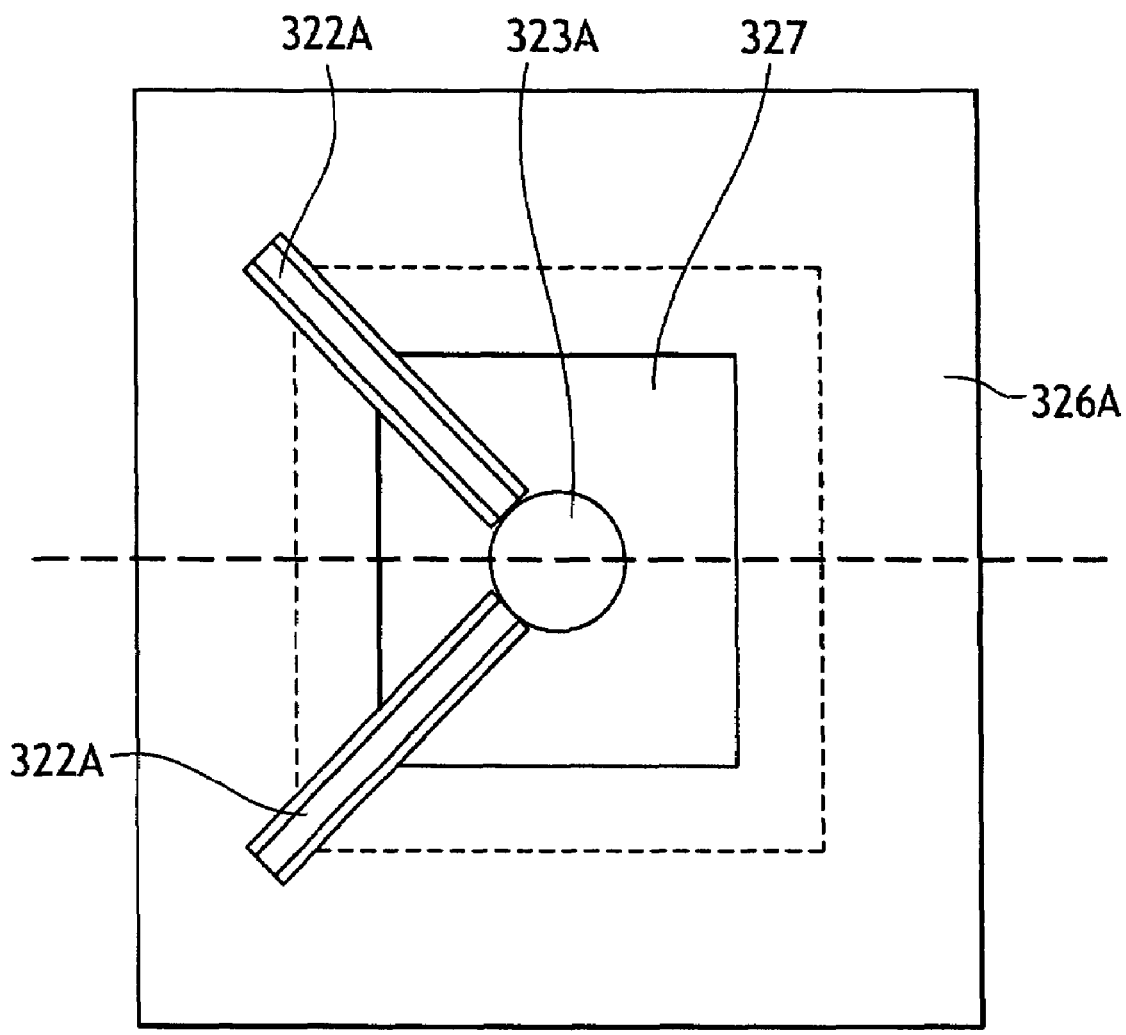
FIG. 6 is a top view of a sealed version of a triple stack piezoresistive pressure sensing die employing dual cantilever beam linked composite pedestal according to the third embodiment of the invention.

FIG. 6 illustrates a view of a sealed version of a triple stack pressure sensing die employing a dual cantilever beam linked composite pedestal according to a second embodiment.

On this figure, a dual beam version of the cantilever beam composite pedestal. It works on the same principle described in FIG. 5, except that there are two beams.

Notice that sealed (un-vented) and vented composite pedestals are built differently.

For the un-vented version, small narrow protrusions are formed by etching the top side of the silicon wafer. Next, the protrusions side of the silicon wafer is anodic bonded to a plain Pyrex wafer that has no vent holes.

For the vented version, wider protrusions are formed by etching the top side of the silicon wafer. In addition, the bottom side of the silicon wafer is etched all the way through the protrusions to create vent holes. Next, the protrusions side of the silicon wafer is anodic bonded to a vented Pyrex wafer that has drilled holes that correspond to the vent holes in the protrusions.

Distortion Simulation

Figure 1:
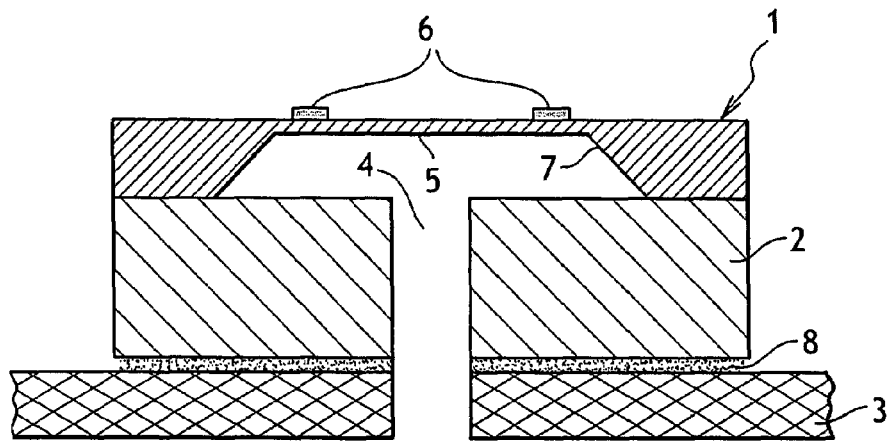
FIG. 1—already discussed—is a cross-sectional view of a prior art conventional dual stack piezoresistive pressure sensing die mounted on a header or substrate.
Figure 7A:
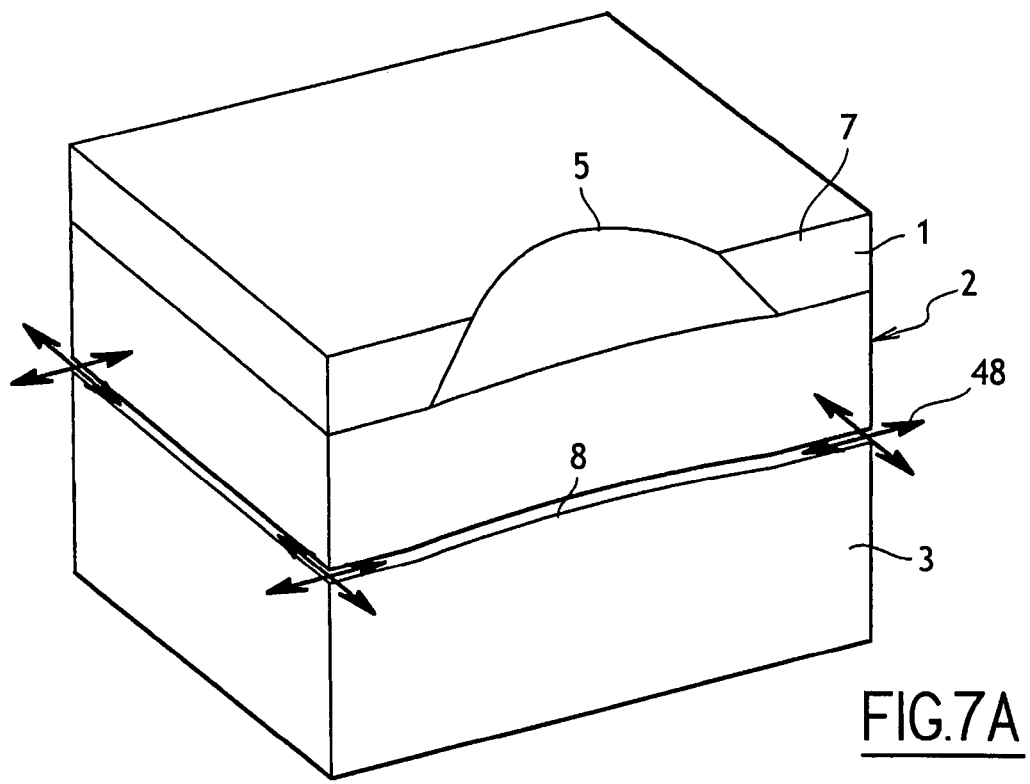
FIGS. 7A and 7B are simulations of magnified distortions induced in the sensing diaphragm by a residual die-attach compression stresses.
Figure 7B:
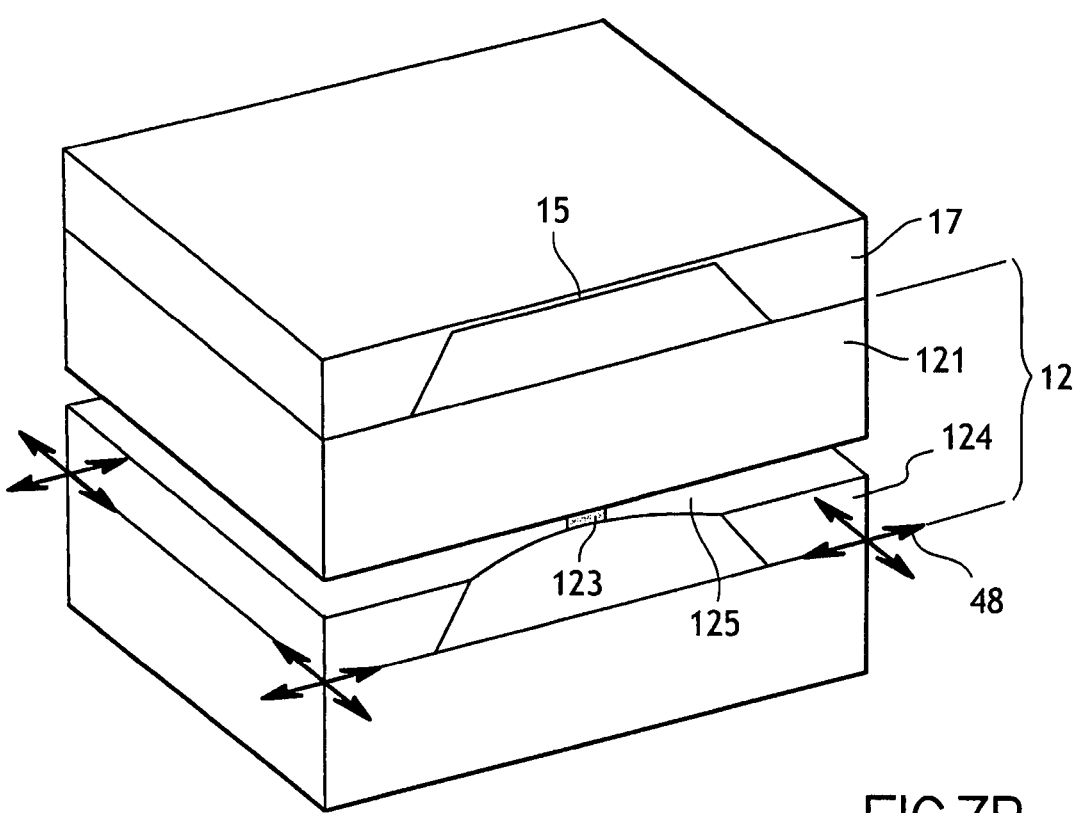

FIGS. 7A and 7B illustrate simulations of magnified distortions induced in the sensing diaphragm 15 by the residual die-attach compression stresses for respectively the known dual stack die of FIG. 1 and for the triple stack die of FIG. 3.

As is shown in FIG. 7A, which simulates the magnified distortions, the "die-attach" compression stress 48 deforms the Pyrex pedestal 2 and the outer frame 7 of the silicon pressure sensing structure 1, which forces sensing diaphragm 5 to deflect upward. The piezoresistors sense the diaphragm deflection and produce a residual null offset output that is proportional to the locked in die-attach stresses.

As is shown in FIG. 7B, which simulates the magnified distortions, the "die-attach" compression stress 48 deforms platform outer frame 124 of flexible composite pedestal 12, which deflects flexible web 322.

The deflection absorbs some of the die-attach stress 48. The remaining stress is compelled to reach top platform 121 through small link 123. The combination of the flexible web and the small link prevents most of the die attach stress from reaching the pressure sensing diaphragm 15.

The invention claimed is:

1. Pressure sensing die to be mounted on a base, comprising:
   a diaphragm structure with a deflectable pressure sensing diaphragm whose deflection is representative of the pressure and sensing elements for detecting the deflection of the sensing diaphragm,
   a pedestal supporting the diaphragm structure,
   wherein the pedestal is a composite pedestal comprising top and bottom platforms connected by at least one small link having a mean cross-section smaller than the cross-section of the top platform, said small link isolating at least some of the stresses, produced by the mounting of the pressure sensing die on the base, from said deflectable pressure sensing diaphragm.

2. Pressure sensing die according to claim 1, wherein the bottom platform comprises at least one protrusion acting as said at least one small link.

3. Pressure sensing die according to claims 1, wherein the bottom platform is a bulk structure comprising a protrusion in its middle, said protrusion acting as said at least one small link.

4. Pressure sensing die according to claims 1, wherein the bottom platform comprises at least a rigid outer frame and a flexible membrane supported by said rigid outer frame, said flexible membrane being thinner than the rigid outer frame and extending inwardly from said rigid outer frame.

5. Pressure sensing die according to claim 4, wherein the flexible membrane bears a protrusion positioned in its middle said protrusion acting as said at least one small link.

6. Pressure sensing die according to claims 5, wherein said protrusion is surrounded by the thinned down web.

7. Pressure sensing die according to claim 4, wherein the bottom platform further comprises a second small link connected to the top platform, said second small link being on the outer edge of the bottom platform.

8. Pressure sensing die according to claim 7, wherein the second small link is a protrusion on the rigid outer frame.

9. Pressure sensing die according to claim 4, wherein the bottom platform further comprises at least one cantilever beam extending inwardly from its outer edge, said cantilever beam comprising a small link formed on its free end, said small link being connected to the top platform.

10. Pressure sensing die according to claim 9, wherein said cantilever beam is further surrounded by the flexible membrane.

11. Pressure sensing die according to claim 9, wherein said cantilever beam and said small link are surrounded by open space.

12. Pressure sensing die according to claim 9, wherein said pressure sensing die comprises at least two cantilever beams.

13. Pressure sensing die according to claim 1, wherein the top platform and the bottom platform comprises a vent hole located in their middle.

14. Pressure sensing die according to claim 1, wherein top and bottom platforms of said composite pedestal are linked by anodic bonding through the small link.

15. Pressure sensing die according to claim 1, wherein top and bottom platforms of said composite pedestal are linked by glass frit through the small link.

16. Pressure sensing die according to claim 1, wherein top and bottom platforms of said composite pedestal are linked by thermo-compression bonding through the small link.

17. Pressure sensing die according to claim 1, wherein the diaphragm structure is linked to the top platform by anodic bonding.

18. Pressure sensing die according to claim 1, wherein the composite pedestal is made of silicon, borosilicate, glass or Pyrex, and the diaphragm structure comprises silicon.

19. Sensor assembly comprising a pressure sensing die according to claim 1, and a base, like a metal header or a plastic or ceramic substrate, on which the pressure sensing die is mounted.

20. Sensor assembly according to claim 19, wherein the pressure sensing die is mounted on the base via an adhesive layer.

21. Method for manufacturing a pressure sensing die to be mounted onto a base, the method comprising the following steps:
forming in a first wafer a pressure diaphragm structure with a deflectable pressure sensing diaphragm whose deflection is representative of the pressure and sensing elements for detecting the deflection of the sensing diaphragm;
providing a second wafer acting as a top platform of a composite pedestal;
forming in a third wafer at least one small link having a mean cross-section smaller than the cross-section of the top platform, said small link isolating at least some of the stresses, produced by the mounting of the pressure sensing die on the base, from said deflectable pressure sensing diaphragm.
attaching the second wafer to the third wafer through said at least one small link;
attaching the second wafer to the first wafer.

22. Method according to claim 21, wherein said at least one small link is surface machined on the top surface of the third wafer.

23. Method according to claim 21, wherein during the step of forming, a membrane supported and a rigid outer frame supporting said membrane are formed.

24. Method according to claim 23, wherein the attachment of the step of attaching comprises anodic bonding.

25. Method according to any claim 21, wherein the steps of forming comprise chemical etching the wafer.

26. Pressure sensing die to be mounted on a base, comprising:
a diaphragm structure with a deflectable pressure sensing diaphragm whose deflection is representative of the pressure and sensing elements for detecting the deflection of the sensing diaphragm,
a pedestal supporting the diaphragm structure, wherein the pedestal is a composite pedestal comprising top and bottom platforms connected by at least one small link having a mean cross-section smaller than the cross-section of the top platform, wherein
said small link isolates at least some of the stresses, produced by the mounting of the pressure sensing die on the base, from said deflectable pressure sensing diaphragm, and
said bottom platform comprises at least a rigid outer frame and at least one cantilever beam extending inwardly from said rigid outer frame, the small link being formed on the free end of said cantilever beam, said small link being connected to the top platform.

27. Pressure sensing die according to claim 26, wherein said cantilever beam is further surrounded by a flexible membrane, said flexible membrane being thinner than the rigid outer frame and extending inwardly from said rigid outer frame.

28. Pressure sensing die according to claim 26, wherein said cantilever beam and said small link are surrounded by open space.

29. Pressure sensing die according to claim 26, wherein said pressure sensing die comprises at least two cantilever beams.

* * * * *

UNITED STATES PATENT AND TRADEMARK OFFICE
CERTIFICATE OF CORRECTION

PATENT NO. : 7,661,318 B2  
APPLICATION NO. : 11/903871  
DATED : February 16, 2010  
INVENTOR(S) : Amnon Brosh and Sebastiano Brida Page 1 of 1

It is certified that error appears in the above-identified patent and that said Letters Patent is hereby corrected as shown below:

In Column 9, Claim 3, line 6, please delete "claims" and insert -- claim --.

In Column 9, Claim 4, line 10, please delete "claims" and insert -- claim --.

In Column 9, Claim 6, line 18, please delete "claims" and insert -- claim --.

Signed and Sealed this  
Ninth Day of August, 2011

David J. Kappos  
*Director of the United States Patent and Trademark Office*